(12) United States Patent
Foladare et al.

(10) Patent No.: US 6,373,926 B1
(45) Date of Patent: Apr. 16, 2002

(54) CENTRALIZED MESSAGE SERVICE APPARATUS AND METHOD

(75) Inventors: Mark Jeffrey Foladare, Kendall Park; Shelley B. Goldman, East Brunswick; David Phillip Silverman, Somerville; Shaoqing Q. Wang; Robert S. Westrich, both of Middletown, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/156,169

(22) Filed: Sep. 17, 1998

(51) Int. Cl.[7] .................. H04M 11/00; G06F 15/16
(52) U.S. Cl. .................. 379/88.13; 379/93.15; 379/88.22; 709/206
(58) Field of Search .................. 379/88.26, 88.18, 379/88.13, 88.14, 88.15, 88.16, 88.17, 67.1, 93.15, 100.01, 88.12, 93.01, 88.22; 709/206, 212, 201, 223, 313, 219, 224

(56) References Cited

U.S. PATENT DOCUMENTS

| | | | | | |
|---|---|---|---|---|---|
| 4,837,798 A | * | 6/1989 | Cohen et al. | ............ | 379/88.14 |
| 5,647,002 A | * | 7/1997 | Brunson | ............ | 709/206 |
| 5,740,230 A | | 4/1998 | Vaudreuil | ............ | 379/88.22 |
| 5,742,668 A | | 4/1998 | Pepe et al. | ............ | 379/88.22 |
| 5,742,905 A | * | 4/1998 | Pepe et al. | ............ | 455/461 |
| 5,751,791 A | | 5/1998 | Chen et al. | ............ | 379/88.13 |
| 5,870,454 A | * | 2/1999 | Dahlen | ............ | 379/88.14 |
| 6,023,700 A | | 2/2000 | Owens et al. | ............ | 455/412 |
| 6,072,862 A | * | 6/2000 | Srinivasan | ............ | 379/100.08 |
| 6,311,210 B1 | * | 10/2001 | Foladare et al. | ............ | 709/206 |

* cited by examiner

Primary Examiner—Fan Tsang
Assistant Examiner—Ovidio Escalante
(74) Attorney, Agent, or Firm—Oliff & Berridge, PLC (57) ABSTRACT

The present invention provides a centralized messaging service method and apparatus in which a message is sent to each of a subscriber's messaging services. When a sending party wishes to leave a message for a receiving party, the sending party activates his/her user device and enters the access number for the centralized message service. The centralized message service receives the communication signals from the sending party which include a receiving party identifier and the message to be sent. The centralized message service then retrieves profile information from a database corresponding to the messaging services of the receiving party based on the receiving party identifier entered by the sending party. The centralized message service then forwards the message to a portion of the receiving party's messaging services based on the profile information retrieved from the database. The centralized message service then monitors the messaging services to determine if the receiving party has retrieved the message from any of the messaging services. If the receiving party retrieves the message from any of the messaging services, a delete command is sent to at least a portion of the other messaging services based on the profile information retrieved.

20 Claims, 7 Drawing Sheets

| 301 | 302 | 303 | 304 | 305 | |
|---|---|---|---|---|---|
| 703-993-9993 | E-MAIL: jones@wpg.com | TEXT | * | * | ... |
|  | PAGER: 703-991-9111 | TEXT | * | * | ... |
|  | VOICE MAIL: 703-993-9993 | VOICE | * |  | ... |
| 791-956-6591 | A-PAGER: 791-999-5555 | TEXT | * | * | ... |
|  | SMS-PAGER: 791-999-6666 | TEXT | * | * | ... |
|  | E-MAIL: smith@jao.com | TEXT | * |  | ... |
|  | VOICE: 791-956-5432 | VOICE | * | * | ... |
|  | E-MAIL 2: jsmith@att.com | TEXT | * |  | ... |
| JONES, BARRY L. | VOICE: 703-555-4141 | VOICE |  |  | ... |
|  | PAGER: 703-916-9573 | TEXT | * | * | ... |

CENTRALIZED MESSAGE SERVICE APPARATUS AND METHOD

RELATED APPLICATION

This application contains similar subject matter to co-pending and similarly assigned U.S. patent application Ser. No. 09/213,355 entitled "METHOD AND APPARATUS FOR SENDING AN ELECTRONIC MAIL MESSAGE TO A RECEIVING PARTY," filed on Dec. 17, 1998.

BACKGROUND OF THE INVENTION

1. Field of Invention

The present invention is directed to a method and apparatus for providing a centralized messaging service for a subscriber.

2. Description of Related Art

Many different types of messaging services are currently used by subscribers to these services. For example, pager services, voice mail, electronic mail, and the like are utilized on a daily basis. A person may subscribe to any number of these services and thus be able to receive messages from a plurality of different sources using their various message devices.

Currently, a party usually sends a message to a service subscribed to by the subscriber in a way that may be convenient to the service. For example, a sending party may choose to send a message by way of an alpha pager service as opposed to voice mail. In this situation, the receiving party who does not have immediate access to an alpha pager may not receive the message promptly. Thus, unless the receiving party has access to a particular message device corresponding to the messaging service that the sending party used, the receiving party may not receive their messages promptly. Accordingly, there is a need for new technology to assist subscribers in receiving their messages promptly.

SUMMARY OF THE INVENTION

The present invention provides a centralized messaging service method and apparatus in which a message is sent to a subscriber's messaging services. When a message is left for a receiving party, by a sending party, a centralized message service processor sends the message to messaging services to which the receiving party subscribes. In this way, the receiving party is able to receive messages promptly regardless of the messaging service with which the sender chooses to send the message.

When sending a message, the sending party activates a user device and enters the access number for the centralized message service. The centralized message service processor receives the communication signals from the sending party and prompts the sending party to enter an identifier of the receiving party for whom they wish to leave a message. The centralized message service processor then verifies that the entered identifier corresponds to a subscriber of the centralized messaging service and, if so, prompts the sending party to enter the message that they wish to send.

Once the sending party enters the message, the centralized message service processor retrieves profile information, based on the access number entered by the sending party, from a database that indicates the messaging services subscribed to by the receiving party. The centralized message service processor then forwards the message to the receiving party by sending the message to the receiving party's messaging service providers. The centralized message service processor then monitors the messaging service providers to determine if the receiving party has accessed the message on any of the messaging service providers. If the receiving party accesses the message on any of the messaging service providers, the message is then deleted from the remaining messaging service providers or a selected number of them.

The profile information retrieved from the database may identify the messaging service providers to which the message is to be sent. Thus, for example, the receiving party may designate in their profile that the message should only be sent to their voice mail accounts and electronic mail and not sent to their pagers or vice versa. Likewise, the receiving party may designate which of the messaging services should delete the message once it is accessed by the receiving party.

In another embodiment of the present invention, the centralized message service processor also provides the capability of translating the message into other message types used by the various messaging services to which the receiving party subscribes. Thus, the message may be sent to all of the messaging services subscribed to by the receiving party. These and other features and advantages are described in or are apparent from the following disclosure.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
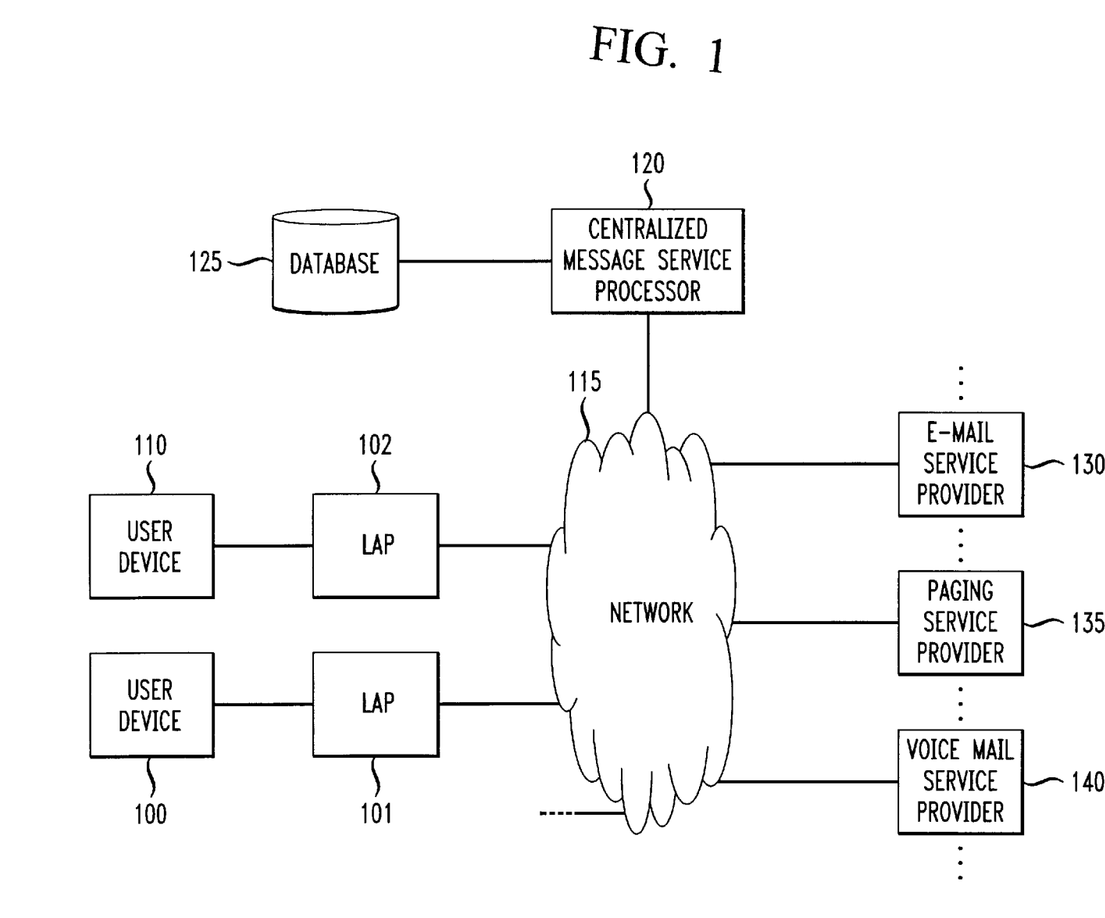
FIG. 1 is a block diagram of a centralized messaging system.

FIG. 1 is a block diagram of a centralized messaging system. The system includes user devices 100 and 110, a network 115, messaging service providers 130, 135, 140, a centralized message service processor 120 and a database 125. The user devices 100 and 110 and the messaging service providers 130, 135 and 140 are in communication with the network 115. The centralized message service provider 120 is also in communication with the network 115 and has access to database 125.

In a first preferred embodiment, a sending party sends a message to a receiving party (subscriber) through the centralized message service processor 120. For example, the subscriber distributes access codes, such as a telephone number or e-mail address, to friends and associates (e.g., customers, vendors, etc.). When the sending party wishes to leave a message for the receiving party, the sending party activates his/her user device 100 and enters the access number, for example the telephone number, IP address, or the like which directs the communication to the centralized message service processor 120. The centralized message service processor 120 receives the communication signals from the sending party and sends a message to the sending party prompting the sending party to enter an identifier of the receiving party for whom they wish to leave a message. The centralized message service processor 120 then verifies that the entered identifier corresponds to a subscriber of the centralized messaging service and, if so, sends a message to the sending party prompting them to enter the message that they wish to send.

Once the sending party enters the message, the centralized message service processor 120 retrieves profile information, based on the access number entered by the sending party, from the database 125 corresponding to the messaging services to which the receiving party subscribes. The centralized message service processor 120 then forwards the message to each of the receiving party's messaging service providers 130, 135 and 140 in accordance with the profile information retrieved. The centralized message service processor 120 then monitors the messaging service providers 130, 135 and 140 to determine if the receiving party has accessed the message on any of the messaging service providers 130, 135 and 140. If the receiving party accesses the message on any of the messaging service providers 130, 135 and 140, the message is then deleted from the remaining messaging service providers or a selected number of them.

The user devices 100 and 110 may be any such device that allows for the transmission of communication signals over communications links. For example, the user device may be a telephone, computer, personal digital assistant, intelligent or computer assisted televisions, WebTV™ apparatus, and the like.

The user devices 100 and 110 are in communication with the network 115 over communications links. These communications links may be any type of connection that allows the transmission of communication signals. Some examples include conventional telephone lines, fiber optic lines, direct serial connection, coaxial cable, wireless communication links and the like.

The network 115 may be a single network or a plurality of networks. For example, the network 115 may include a local telephone network (such as a Bell Atlantic telephone network) in connection with a long distance network (such as an AT&T long distance telephone network) or a company's proprietary intranet in connection with an IP data network such as the Internet. The types of networks that may be used include communications networks, cable TV networks, the Internet, private intranets, cellular communication network, a local area network (LAN), a wide area network (WAN) and the like. The network 115 may also be any combination of these types of networks.

The centralized message service processor 120 may be a single processor or may be a distributed processing system incorporated into the network 115. The centralized message service processor 120 may further be in connection with a plurality of different network types at the same time. For example, the centralized message service processor 120 may be in connection with both a data network and a telecommunications network and process communications over both networks.

Figure 2:
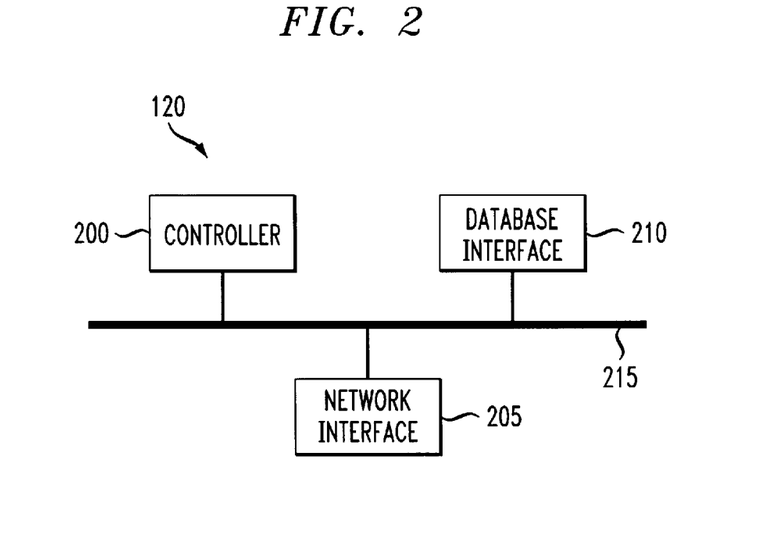
FIG. 2 is a block diagram of a first embodiment of the centralized message service processor of FIG. 1.

FIG. 2 is a block diagram of a first embodiment of the centralized message service processor 120 of FIG. 1. The centralized message service processor 120 includes a controller 200, a network interface 205 and a database interface 210. The controller 200 communicates with network 115 through network interface 205 and database 125 through database interface 210. The controller 200, network interface 205 and database interface 210 communicate with one another over bus 215. The network interface 205 may include a plurality of interfaces that facilitate communication with the different types of networks with which communication is made. For example, the network interface 205 may include an interface to a data network and another interface to a conventional voice telecommunications network.

The controller 200 receives communication signals from a sending party's user device 100 through network 115 and network interface 205, for example. The communication signals establish a communication link between user device 100 and the centralized message service processor 120.

When the communication signals are received by the network interface 205, the type of communication signals being received is determined. For example, the communication signals may be of the analog voice or text data type. The type of communication signals may be determined in any known manner. For example, the type of communication signals may be determined by determining the port of the network interface 205 through which the communication signals are received (e.g. voice telecommunications network port or data network port).

Upon establishment of the communication link and determination of the type (i.e., text or voice) of communication signals being received, the controller 200 sends a prompt to the user device 100. The prompt requests that the sending party enter an identifier of the receiving party, i.e. the party for whom the message is to be sent. The identifier may be the telephone number, extension number, e-mail address, pager number, name, personal identification code, or any other identifier that may be used to identify an individual person or device.

The identifier may be entered through a user interface located on or in connection with the user device 100. The user interface may be, for example, a telephone keypad, keyboard, microphone, speech recognition device, pointing device, and the like. The user interface may also be any combination of the above.

The prompts are of the same communication type as that of the communication signals that are received. Thus, if an analog voice signal is received, the controller 200 will send a request comprising an audible message such as "Please enter the telephone number of the party for whom you wish to leave a message" or the like. The audible message may be a prerecorded message, a synthesized voice message or the like. Alternatively, if a data signal is received, the request may be, for example, an ASCII data stream of a textual message stating "Please enter the e-mail address of the party for whom you wish to leave a message" or the like.

The controller 200 will then await a response from the user device 100 providing the identifier of the receiving party. Upon receiving a response, the controller 200 searches the database 125, through database interface 210, and retrieves the profile information stored in the database 125 corresponding to the identifier received from the user device 100. If the identifier does not have a corresponding entry in the database 125, a message is then sent to the user device indicating that the receiving party does not subscribe to the service and requests that the sending party reenter a correct identifier or terminate the communication.

Profile information for each of the subscribers is stored in the database 125. The profile information is used to identify the messaging services to which the messages are to be sent, the messaging services from which messages are to be deleted after the message is accessed by the receiving party, the personal preferences of the receiving party (subscriber), and the like. The profile information contains such information as the messaging services to which the receiving party subscribes, their access numbers, the types of communication signals that they can receive, the messaging services that the receiving party wishes to have messages forwarded to, the messaging services to delete the message from when the message has been accessed by the receiving party, and the like.

The profile information may further include information identifying preferences based on the sending party. For example, the profile information may include information that indicates that messages from a specified sending party should be forwarded to the subscriber's pager and work electronic mail account and that another sending party's messages should be forwarded only to the subscriber's home electronic mail account. Many different types of information and combinations of information may be included in the profile information of the database 125 without departing from the spirit and scope of the present invention.

Figure 3:
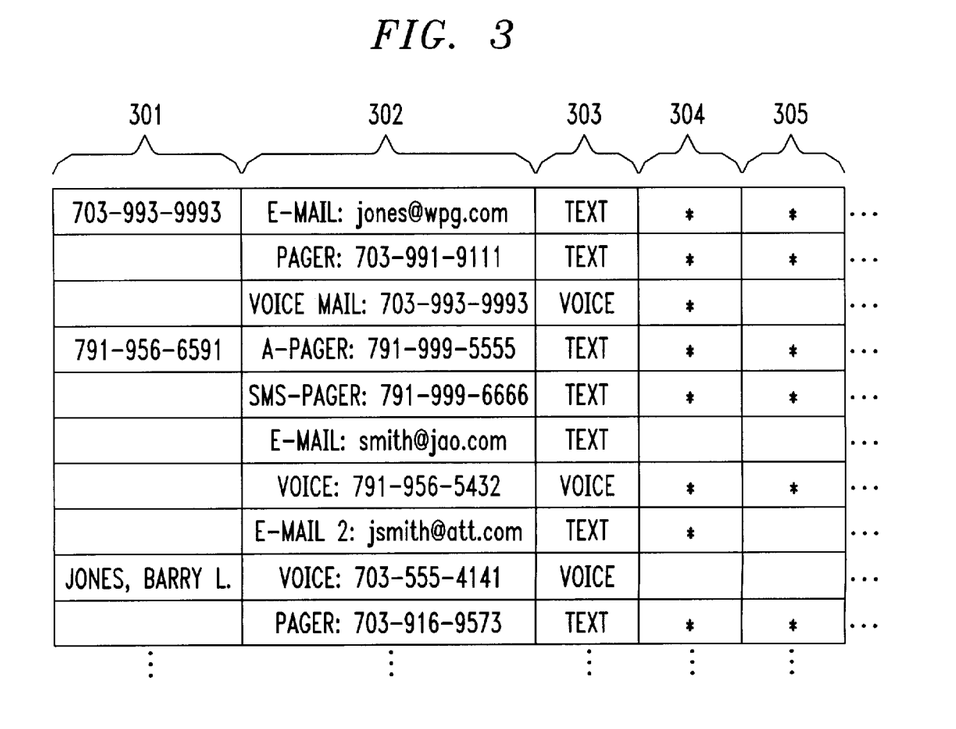
FIG. 3 is an exemplary diagram of a data structure of the database of FIG. 1.

FIG. 3 is an exemplary data structure of the database 125. As shown in FIG. 3, the data structure contains a field 301 for the receiving party identifier, a field 302 for the access numbers of the messaging services to which the receiving party subscribes, a field 303 for identifying the type of the communication signals used by the messaging services, a field 304 for identifying the messaging services to which the message is to be sent and a field 305 for identifying from which messaging services to delete the message when the message is accessed by the receiving party. The asterisk "*" in fields 304 and 305 designates those messaging services that should receive the message and those that should receive a delete signal when the message is accessed by the receiving party.

Once the profile information is retrieved from the database 125, the controller 200 sends a prompt to the user device 100 for the sending party to enter the message that they wish to leave. This message may be in the form of an analog voice message or data message, such as a text message (e.g., e-mail), depending on the communication format used by the sending party user device 100. When the message is received, the controller 200 sends a confirmation message to the sending party's user device 100 providing them with options to review, delete, amend and send the message.

Choosing the review command causes the controller 200 to send the message created by the sending party back to the sending party's user device 100 for review. Choosing the delete command deletes the message created by the sending party. Choosing the amend command allows the sending party to add to the message already created. Choosing the send command causes the controller 200 to send the message to the receiving party's messaging services.

Upon receiving the send command, the controller 200 sends the message to the messaging services to which the receiving party subscribes using the profile information retrieved from the database 125. The messaging services to which the message is sent may be dependent on the type of communication signals of the message and the communication types that may be received by the messaging services. Thus, for example, if the message received is a text data message, the messaging services that may receive such a message include e-mail, alpha-pager, and a Synchronous Meterological Satellite (SMS) pager. Therefore, the message will only be sent to those messaging services using the received message communication type and will not be sent to messaging services using another communication type, such as voice mail.

Alternatively, as will be explained with reference to a second embodiment of the present invention described below, the communication type of the message may be translated into all communication types necessary to send the message to all of the messaging services to which the receiving party subscribes.

Likewise, the messaging services to which the message is sent may be dependent on the messaging services designated in the profile information, for example in field 304 of FIG. 3. Thus, the subscriber may designate where the messages are to be forwarded. The subscriber may further designate where the messages are to be forwarded based on the identification of the sending party.

After sending the message to the appropriate messaging services, the controller 200 monitors the messaging services to determine if the message is received by the receiving party from any of the messaging services. The monitoring may be performed by sending query messages to the messaging services or may be performed by awaiting respective signals from the messaging services indicating that the receiving party has accessed the message.

The query message may take the form of a message requesting that the messaging service indicate whether the receiving party has deleted the message from the messaging device corresponding to the messaging service. Alternatively, the messaging services may be adapted to send a signal to the centralized message service processor 120 when the message has been deleted from the messaging service. Other methods of determining whether the message has been accessed are readily known to those of ordinary skill in the art and may be used without departing from the spirit and scope of the present invention.

Once the controller 200 determines that the message has been accessed by the receiving party from at least one of the messaging services, the controller 200 sends a command signal to the other messaging services to which the receiving party subscribes, instructing them to delete the message. The subscriber may establish a "delete" list in the database 125, for example field 305 of FIG. 3, identifying which messaging services should receive the delete command and/or which messaging services should not receive a delete command. If a "delete" list is established, the delete command signal will be sent to only those messaging services that are flagged to receive the delete command.

Figure 4:
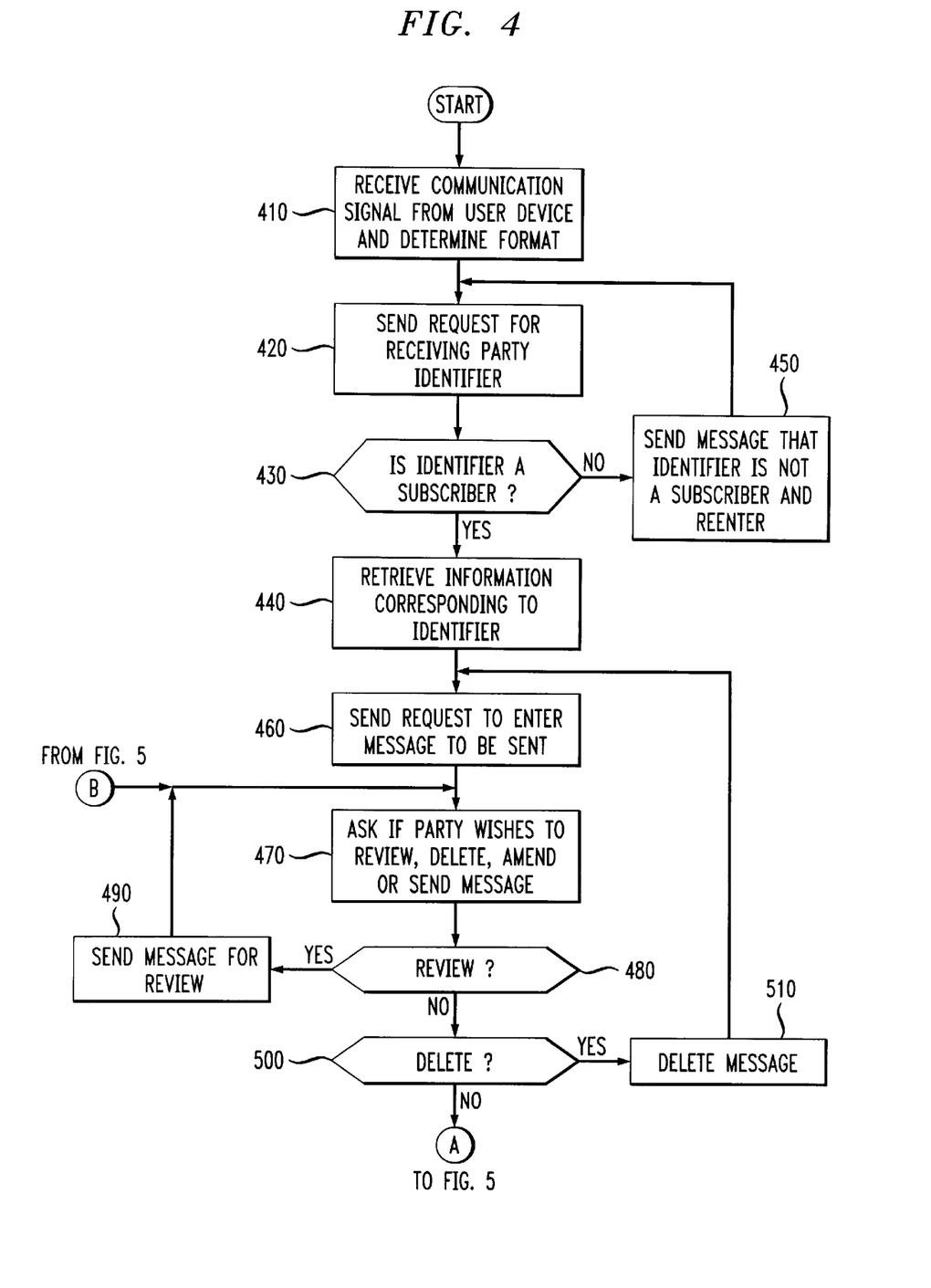
FIGS. 4 and 5 show a flowchart of a process of the centralized message service processor of the first embodiment.
Figure 5:
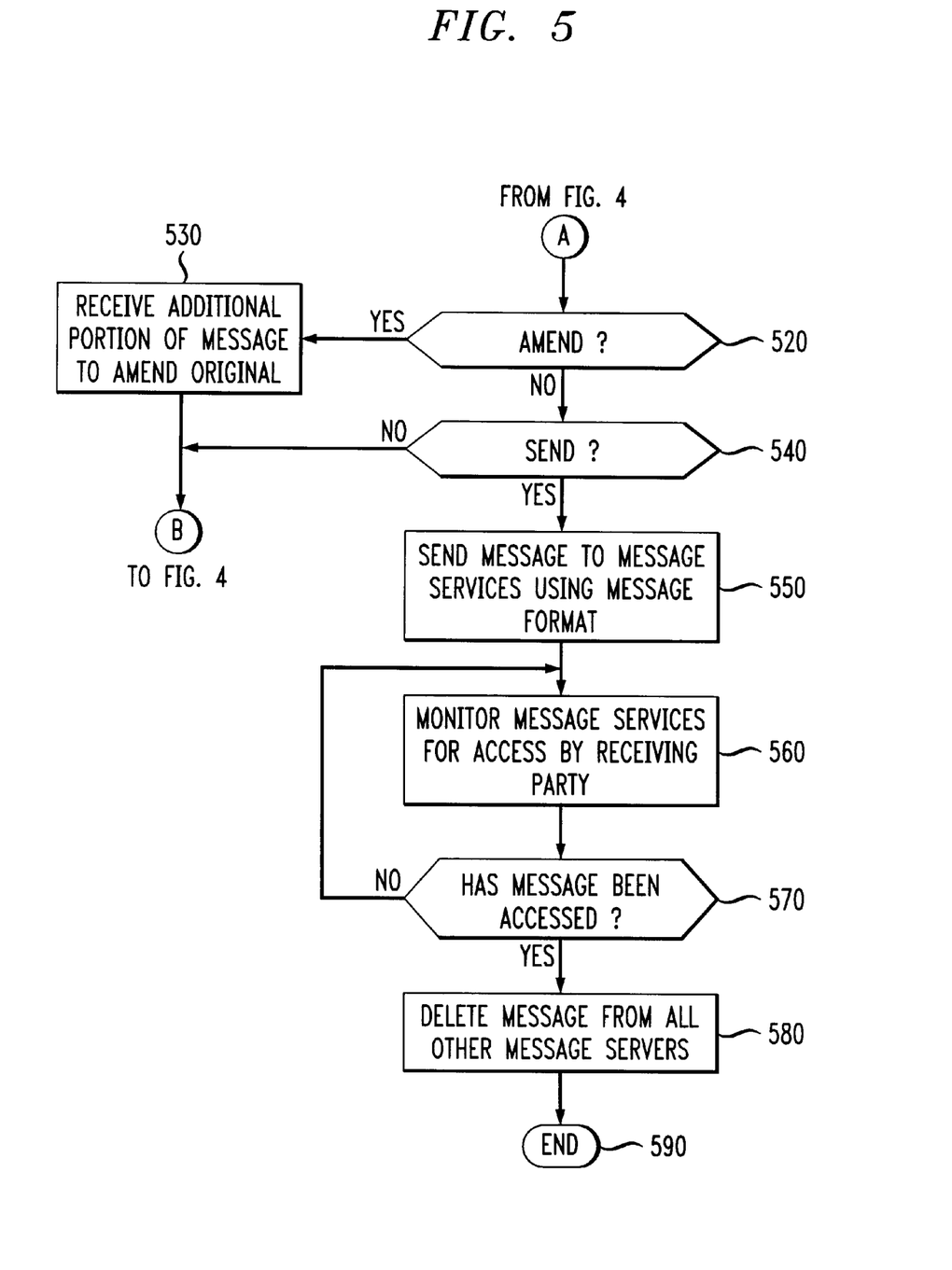

FIGS. 4 and 5 show a flowchart of the operation of the centralized message service processor 120 of FIG. 2. As shown in FIGS. 4 and 5, in step 410 the controller 200 receives a communication signal from a user device 100 and goes to step 420. The communication signals have a type determined by the network interface 205 as described above. In step 420, the controller 200 prompts the user device 100 to enter an identifier of the receiving party and goes to step 430.

In step 430, the controller 200 receives the identifier and determines if the identifier identifies a subscriber. If the identifier identifies a subscriber, the controller 200 goes to step 440; otherwise, the controller 200 goes to step 450 where the controller 200 sends a message to the user device 100 informing the sending party that the receiving party is not a subscriber and returns to step 420 so that the sending party may reenter the identifier if it was incorrectly entered.

In step 440, the controller 200 retrieves profile information from the database 125 corresponding to the identifier and goes to step 460. In step 460, the controller 200 prompts the user device 100 of the sending party to enter the message to be sent and goes to step 470.

In step 470, the controller 200 receives the message and sends a message to the user device 100 asking the sending party if they wish to review, delete, amend or send the message they have created. For example, the message may be a prerecorded message that states "Please press 1 to review, 2 to delete, 3 to amend or 4 to send" or the like. The controller 200 then continues to step 480.

In step 480, if the sending party wishes to review the message, the controller 200 goes to step 490 where the message is sent back to the sending party's user device 100 for review and the controller 200 returns to step 470; otherwise, the controller 200 goes to step 500.

In step 500, if the sending party wishes to delete the message, the controller 200 goes to step 510 where the controller 200 deletes the message and returns to step 460; otherwise the controller 200 goes to step 520 as shown in FIG. 5. In step 520, if the sending party wishes to amend the message, the controller 200 goes to step 530; otherwise the controller 200 continues to step 540. In step 530, the controller 200 receives the additional portion of the message to be amended and returns to step 470.

In step 540, if the sending party wishes to send the message, the controller 200 continues to step 550; otherwise the controller 200 returns to step 470. In step 550, the controller 200 sends the message to the messaging services subscribed to by the receiving party, as identified by the profile information retrieved from the database 125, that are able to receive messages in the particular format of the message created by the sending party and goes to step 560.

In step 560, the controller 200 monitors the messaging services of the receiving party to determine if the receiving party accesses the message and goes to step 570. In step 570, if the receiving party accesses the message, the controller 200 goes to step 580; otherwise the controller 200 returns to step 560. In step 580, the controller 200 sends a delete command to the messaging services that received the message and were not accessed by the receiving party. Alternatively, the message may be deleted from only those messaging services flagged for deletion in a "delete" list stored in database 125. The controller 200 then continues to step 590 and ends.

Using the above centralized message service processor 120, a receiving party may receive a message from a plurality of messaging services to which the receiving party subscribes based on profile information stored in database 125 and the type of message. Thus, there is a higher probability that the receiving party will receive the message and a higher probability that the receiving party will be able to respond more quickly to the message.

Figure 6:
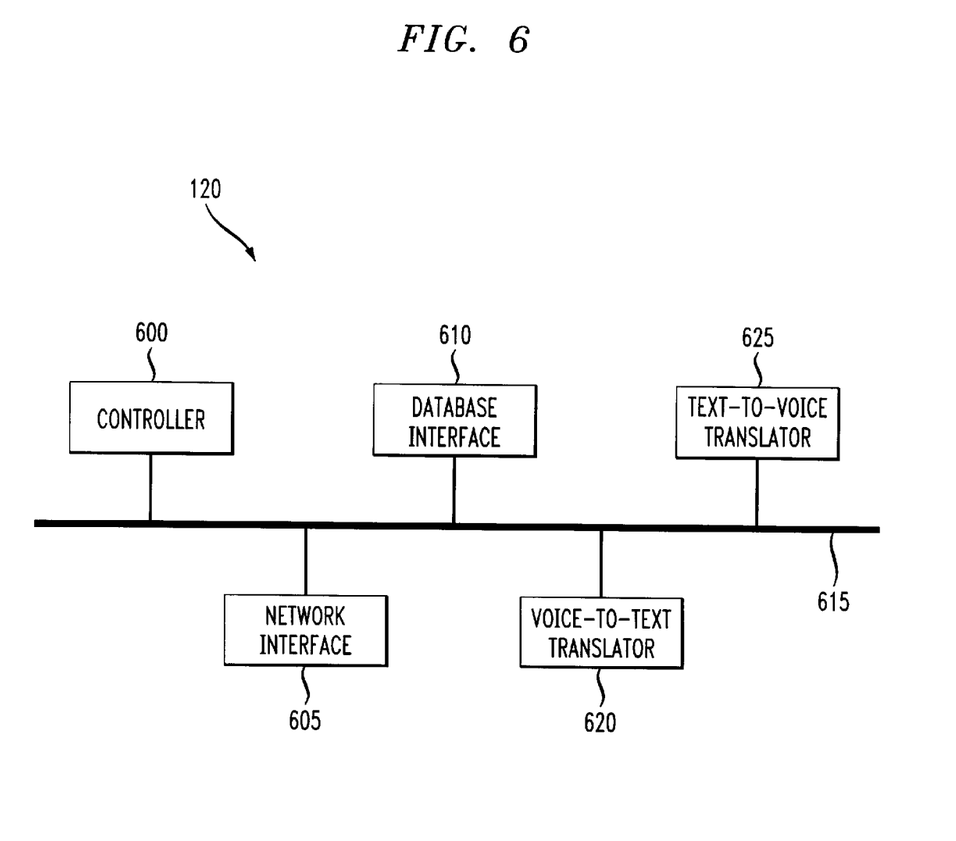
FIG. 6 is a block diagram of a second exemplary embodiment of the centralized message service processor.

FIG. 6 is a block diagram of a second embodiment of the present invention in which the centralized message service processor 120 performs a conversion of the message type so that all messaging services subscribed to by the receiving party may receive the message.

As shown in FIG. 6, the centralized message service processor 120 of the second embodiment differs from the first embodiment in the addition of the voice-to-text translator 620 and text-to-voice translator 625. In this second embodiment, the controller 600 receives the communication signals from the sending party's user device 100. The communication signals have a type determined by the network interface 605.

The controller 600 prompts the user device 100 for the sending party to enter the identifier of the receiving party and then retrieves profile information from the database 125 corresponding to the identifier. The controller 600 then prompts the sending party to enter the message they wish to send and provides them with the options to review, delete, amend and send the message in the same manner as described in the first embodiment.

Once the send command is selected by the sending party, the message is sent to all of those messaging services identified in the profile information and that are able to receive messages of the same type as the original message. Then, if the receiving party has identified other messaging services to receive the message that use other message types, the message is translated into those message types and sent to the respective messaging services.

Thus, if the original message is an analog voice message, the voice-to-text translator 620 is utilized to translate the analog voice message into a text message that may be sent to text based messaging services. Similarly, if the original message is a text message, such as a e-mail or alpha pager message, the text-to-voice translator 625 translates the message into a synthesized voice equivalent of the text message using known voice synthesis techniques.

As in the first embodiment, the messaging services are then monitored to determine if the receiving party accesses the message and, if so, the message is deleted from all of the messaging services or a selected number of the messaging services.

Figure 7:
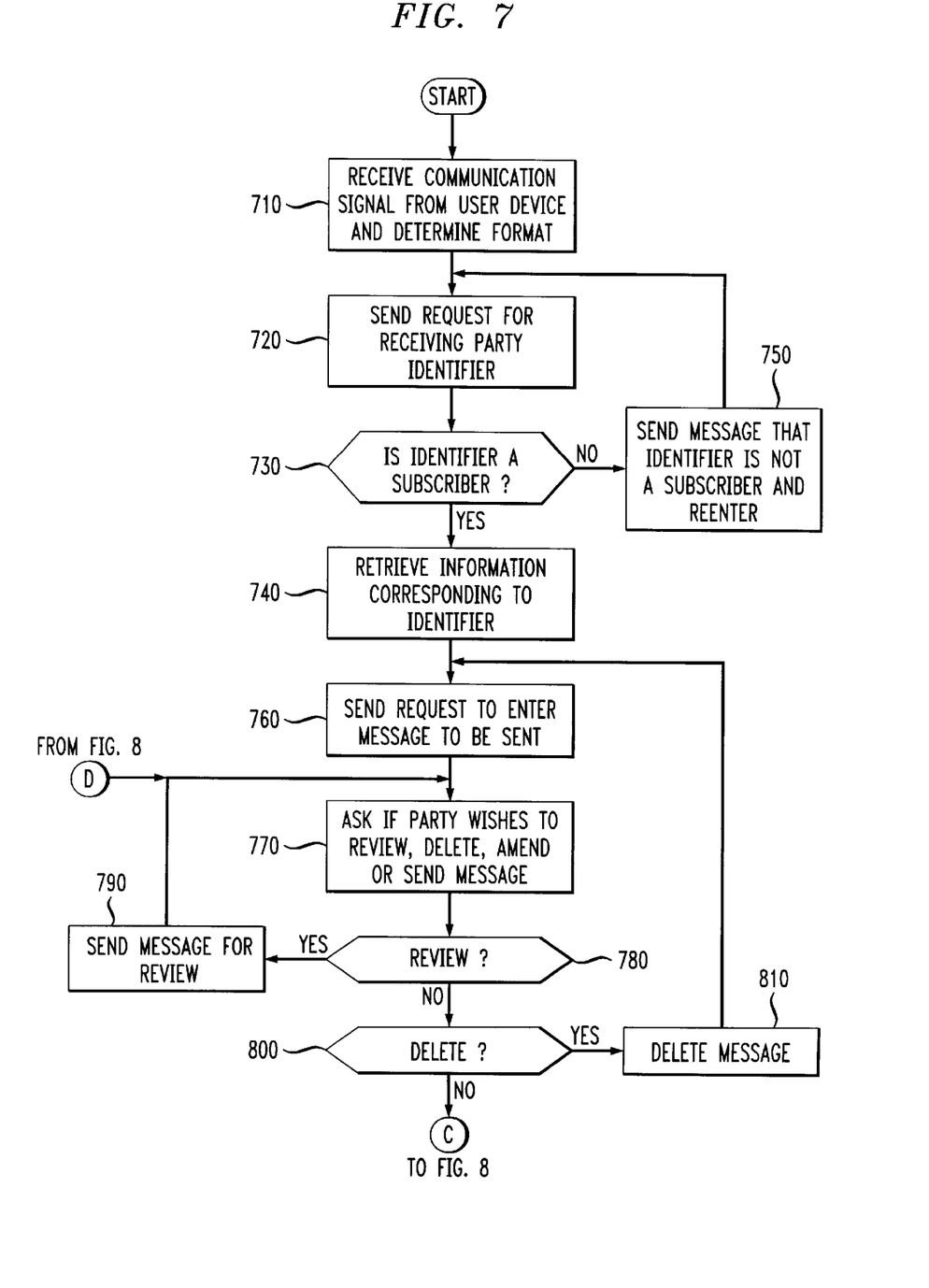
FIGS. 7 and 8 show a flowchart of a process of the centralized message service processor of the second embodiment.
Figure 8:
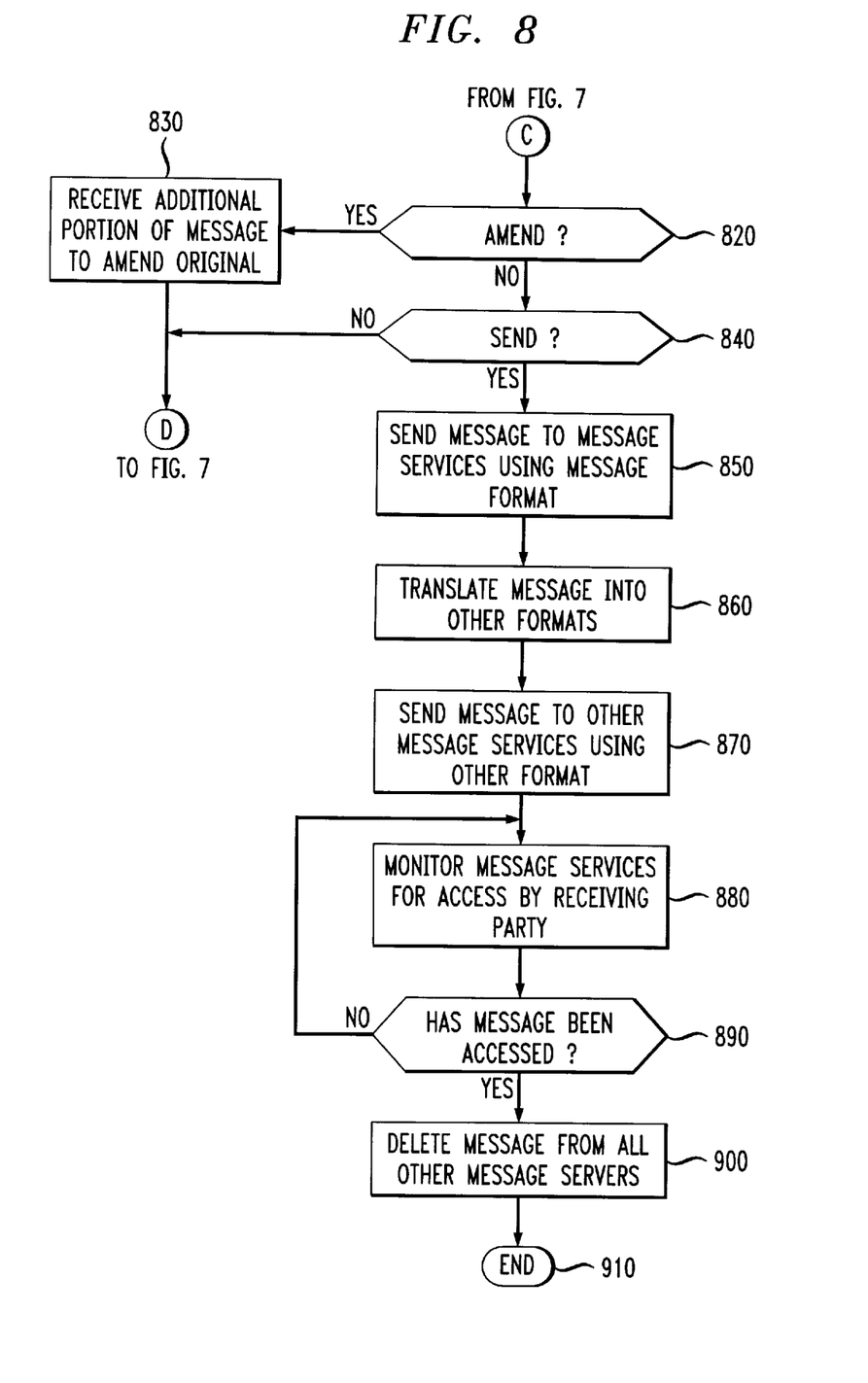

FIGS. 7 and 8 show a flowchart of the operation of the centralized message service processor 120 of the second embodiment. As shown in FIGS. 7 and 8, in step 710 the controller 600 receives a communication signal from a user device 100 and goes to step 720. The communication signals have a type that is determined by the network interface 605 as described above. In step 720, the controller 600 prompts the user device 100 for the identifier of the receiving party and goes to step 730.

In step 730, the controller 600 receives the identifier and determines if the identifier identifies a subscriber. If the identifier identifies a subscriber, the controller 600 goes to step 740; otherwise, the controller 600 goes to step 750 where the controller 600 sends a message to the user device 100 informing the sending party that the receiving party is not a subscriber and returns to step 720 so that the sending party may reenter the identifier if it was incorrectly entered.

In step 740, the controller 600 retrieves information from the database 125 corresponding to the identifier and goes to step 760. In step 760, the controller 600 prompts the user device 100 for the message that is to be sent and goes to step 770.

In step 770, the controller 600 receives the message and sends a message to the user device 100 asking the sending party if they wish to review, delete, amend or send the message they have created. For example, the message may be a prerecorded message that states "Please press 1 to review, 2 to delete, 3 to amend or 4 to send" or the like. The controller 600 then continues to step 780.

In step 780, if the sending party wishes to review the message, the controller 600 goes to step 790 where the message is sent back to the sending party's user device 100 for review and the controller 600 returns to step 770; otherwise, the controller 600 goes to step 800.

In step 800, if the sending party wishes to delete the message, the controller 600 goes to step 810 where the controller 600 deletes the message and returns to step 760; otherwise the controller 600 goes to step 820. In step 820, if the sending party wishes to amend the message, the controller 600 goes to step 830; otherwise the controller 600 continues to step 840. In step 830, the controller 600 receives the additional portion of the message to be amended and returns to step 770.

In step 840, if the sending party wishes to send the message, the controller 600 continues to step 850; otherwise the controller 600 returns to step 770. In step 850, the controller 600 sends the message to all the messaging services subscribed to by the receiving party, as identified by the profile information retrieved from the database 125, that are able to receive message having the original message type and goes to step 860.

In step 860, the controller 600 translates the message into the message type of the other messaging services to which the receiving party subscribes using, for example, the voice-to-text translator 620 or the text-to-voice translator 625 depending on the format of the original communication signals and goes to step 870. In step 870, the controller 600 sends the translated message to the other messaging services to which the receiving party subscribes and goes to step 880.

In step 880, the controller 600 monitors all of the messaging services of the receiving party that received the message to determine if the receiving party accesses the message and goes to step 890. In step 890, if the receiving party accesses the message, the controller 600 goes to step 900; otherwise the controller 600 returns to step 880. In step 900, the controller 600 sends a delete command to the messaging services that received the message and were not accessed by the receiving party. Alternatively, the message may be deleted from only those messaging services flagged for deletion in a "delete" list stored in database 125. The controller 600 then continues to step 910 and ends.

As a practical example of the above embodiments, consider a sending party wishing to send a message to a receiving party using a computer as the sending party's user device 100. The sending party logs onto the centralized message service processor 120 by, for example, entering the IP address of the centralized message service processor 120 into an Internet browser program running on the user device 100.

Once the sending party logs onto the centralized message service processor 120, the centralized message service processor 120 determines that the type of communication being conducted is text data since the sending party has logged onto the data communication port of the centralized message service processor 120. The centralized message service processor 120 then prompts the sending party, using text messages sent to the sending party's IP address, for the receiving party identifier.

The receiving party identifier may be, for example, the e-mail address of the receiving party, the receiving party's name, user id, and the like. Once the centralized message service processor 120 receives the receiving party identifier, the centralized message service processor 120 retrieves profile information from the database 125 corresponding to the receiving party identifier, assuming the receiving party is a subscriber to the centralized message service.

The centralized message service processor 120 then prompts the sending party to enter the message that is to be sent to the receiving party. Based on the profile information retrieved from the database 125, the centralized message service processor 120 then sends the message to the designated messaging services to which the receiving party subscribes. In the first embodiment, the message is only sent to those messaging services that support text type messages. In the second embodiment, the text message is also translated into a synthesized voice version of the message and forwarded to the receiving party's text and voice messaging services.

While the above embodiments have been described with the sending party first accessing the centralized message service processor 120 directly, the present invention may also be accessed automatically when the sending party attempts to contact the receiving party through one of the messaging services. In this case, when the sending party attempts to establish a communication connection with the receiving party's home telephone or work telephone, for example, and the receiving party is not available to receive the communication, the communication signals may be automatically rerouted to the centralized message service processor 120 using automatic call forwarding. In this way, the sending party need not know the access number of the centralized message service processor 120 and yet still be able to take advantage of the services the centralized message service processor 120 provides.

Additionally, while the above embodiments have been described wherein the centralized message service processor 120 sends a series of prompts to the sending party, the particular set of prompts described above are only illustrative and are not meant to be limiting. Any series of prompts or lack thereof may be used to facilitate the entry of the receiving party identifier and the message to be sent without departing from the spirit and scope of the present invention. For example, if the sending party attempts to send an e-mail message to the receiving party through the centralized message service processor 120, the sending party need not be prompted for the receiving party's identifier and message since this information is already contained within the e-mail message in fields designated for such information. In this case, the centralized message service processor 120 may obtain this information automatically from the e-mail message and retrieve the appropriate profile information from the database 125 to forward the message to all appropriate messaging services of the receiving party.

As shown in FIGS. 2 and 6, the method of this invention is preferably implemented on a programmed processor. However, the centralized message service processor 120 can also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which a finite state machine capable of implementing the flowcharts shown in FIGS. 4, 5, 7 and 8 can be used to implement the centralized message service processor functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A message sending apparatus that sends messages to a plurality of messaging services of a receiving party, comprising:
    a controller; and
    a database, wherein the controller receives a receiving party identifier and retrieves information from the database corresponding to the receiving party identifier, the information identifying the messaging services of the receiving party, and wherein the controller sends a message to the messaging services of the receiving party based on the information retrieved from the database;

wherein the controller monitors the messaging services to which the message was sent and determines if the message is retrieved using at least one of the messaging services, and wherein the controller sends a delete command to a portion of the other messaging services in response to the retrieval of the message.

2. The apparatus of claim 1, wherein the controller receives the message from a sending party user device and determines a first message type of the message, and wherein the message is sent to only those messaging services of the receiving party that are capable of receiving messages having the first message type.

3. The apparatus of claim 2, wherein the controller translates the message into a second message type different from the first message type and sends the message to those messaging services of the receiving party that are capable of receiving messages having the second message type.

4. The apparatus of claim 3, wherein the controller translates the message from analog voice to text data.

5. The apparatus of claim 3, wherein the controller translates the message from text data to analog voice.

6. The apparatus of claim 1, wherein the controller retrieves a delete list from the database and the delete command is sent to the messaging services that are flagged for deletion in the delete list.

7. The apparatus of claim 1, wherein the controller receives a signal from a messaging service to which the message was sent indicating that the message has been retrieved.

8. The apparatus of claim 1, wherein the messaging services include at least one of electronic mail, paging service and voice mail.

9. The apparatus of claim 1, wherein the receiving party identifier includes at least one of an electronic mail address, a telephone number, a pager number, extension number, a name and a personal identification code.

10. The apparatus of claim 1, wherein the first and second message types include at least one of analog voice and text data.

11. A method of sending a message to a plurality of messaging services of a receiving party, comprising:

receiving a receiving party identifier;

identifying the messaging services of the receiving party based on the receiving party identifier;

sending the message to the messaging services;

monitoring whether the message is retrieved from at least one of the messaging services; and deleting the message from a portion of the other messaging services, wherein the deleting the message is performed in response to the retrieval of the message.

12. The method of claim 11, further comprising:

receiving a message from a sending party user device; and determining a first message type of the message, wherein the message is sent in the sending step to only those messaging services of the receiving party that are capable of receiving messages having the first message type.

13. The method of claim 12, further comprising:

translating the message into a second message type different from the first message type; and sending the message to those messaging services of the receiving party that are capable of receiving messages having the second message type.

14. The method of claim 13, wherein the translating step further comprises translating the message from analog voice to text data.

15. The method of claim 13, wherein the translating step further comprises translating the message from text data to analog voice.

16. The method of claim 11, further comprising deleting the message based on a delete list.

17. The method of claim 11, wherein the step of monitoring comprises receiving a signal from a messaging service to which the message was sent indicating that the message has been retrieved.

18. The method of claim 11, wherein the messaging services include at least one of electronic mail, paging service and voice mail.

19. The method of claim 11, wherein the receiving party identifier includes at least one of an electronic mail address, a telephone number, a pager number, extension number, a name and a personal identification code.

20. The method of claim 11, wherein the first and second message types include at least one of analog voice and text data.

* * * * *